(12) United States Patent
Shiino et al.

(10) Patent No.: US 11,377,136 B2
(45) Date of Patent: Jul. 5, 2022

(54) STEERING DEVICE

(71) Applicant: HITACHI AUTOMOTIVE SYSTEMS, LTD., Hitachinaka (JP)

(72) Inventors: Kohtaro Shiino, Isehara (JP); Tadaharu Yokota, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 286 days.

(21) Appl. No.: 16/558,685

(22) Filed: Sep. 3, 2019

(65) Prior Publication Data

US 2020/0079419 A1   Mar. 12, 2020

(30) Foreign Application Priority Data

Sep. 11, 2018   (JP) .............................. JP2018-169518

(51) Int. Cl.
  *B62D 5/04*   (2006.01)
  *B62D 7/16*   (2006.01)
  (Continued)

(52) U.S. Cl.
  CPC ................. *B62D 5/04* (2013.01); *B62D 6/00* (2013.01); *B62D 7/16* (2013.01); *B62D 5/0448* (2013.01); *B62D 6/002* (2013.01); *B62D 15/0225* (2013.01)

(58) Field of Classification Search
  CPC ... B62D 5/04; B62D 6/00; B62D 7/16; B62D 5/0448; B62D 15/0225; B62D 6/002
  See application file for complete search history.

(56) References Cited

U.S. PATENT DOCUMENTS

| 6,578,862 B2 * | 6/2003 | Park .......................... B62D 3/12 280/444 |
| 6,834,742 B2 * | 12/2004 | Nakatsu ................. B62D 5/008 180/444 |

(Continued)

FOREIGN PATENT DOCUMENTS

| CN | 104210535 A | 12/2014 |
| JP | 62-012457 A | 1/1987 |

(Continued)

OTHER PUBLICATIONS

First Office Action dated Oct. 11, 2021 issued in CN Application No. 201910857011.4, with English translation, 20 pages.

(Continued)

*Primary Examiner* — Kevin Hurley
*Assistant Examiner* — Marlon A Arce
(74) *Attorney, Agent, or Firm* — Foley & Lardner LLP (57) ABSTRACT

A steering device includes an electric actuator that applies a steering force to one end side of a steering shaft. The other end side of the steering shaft is provided with a displacement detection part for detecting the movement amount of the steering shaft. Either a detection target or a displacement detection sensor is provided on the steering shaft and the other is provided in a housing so as to output a signal according to a relative position change amount of the detection target with respect to the displacement detection sensor in the direction of the first axis. A first restriction mechanism restricts the relative movement of the detection target and the displacement detection sensor in a radial direction regarding the first axis to limit the change in the relative position in the radial direction of the detection target and the displacement detection sensor.

22 Claims, 6 Drawing Sheets

(51) Int. Cl.
*B62D 6/00* (2006.01)
*B62D 15/02* (2006.01)

(56) References Cited

U.S. PATENT DOCUMENTS

| | | | |
|---|---|---|---|
| 7,974,754 B2* | 7/2011 | Nakatsu | B62D 5/008 |
| | | | 701/41 |
| 8,281,687 B2* | 10/2012 | Koma | B62D 15/0215 |
| | | | 74/575 |
| 10,322,744 B2* | 6/2019 | Eickholt | F16H 55/36 |
| 2002/0195893 A1 | 12/2002 | Kobayashi et al. | |
| 2004/0016591 A1* | 1/2004 | Kojo | B62D 5/008 |
| | | | 180/443 |
| 2012/0097473 A1 | 4/2012 | Tashiro | |
| 2014/0353071 A1 | 12/2014 | Ando et al. | |
| 2017/0104383 A1* | 4/2017 | Fujisaki | F16C 25/083 |
| 2017/0130769 A1 | 5/2017 | Ikeda et al. | |
| 2017/0203783 A1* | 7/2017 | Yamashita | B62D 5/0403 |
| 2018/0086365 A1* | 3/2018 | Lam | B62D 5/0424 |

FOREIGN PATENT DOCUMENTS

| | | |
|---|---|---|
| JP | 2012-106720 A | 6/2012 |
| JP | 2013-159131 A | 8/2013 |
| JP | 2014-213775 | 11/2014 |
| JP | 2014-232034 A | 12/2014 |
| JP | 2015-137657 A | 7/2015 |
| JP | 2016-155443 A | 9/2016 |
| JP | 2017-082918 A | 5/2017 |
| JP | 2017-087972 A | 5/2017 |
| WO | WO-2018/139569 | 8/2018 |

OTHER PUBLICATIONS

Notice of Reasons for Refusal dated Apr. 5, 2022 issued in JP Application No. 2018-169518, with English translation, 16 pages.

* cited by examiner

STEERING DEVICE

BACKGROUND OF THE INVENTION

Field of the Invention

The present invention relates to vehicle steering devices.

Description of Related Art

JP2014-213775A (Patent Document 1) describes a pinion-assist-type rear wheel steering device. In Patent Document 1, a resolver is used for detecting a rear wheel steering angle.

However, it is necessary for the steering device of Patent Document 1 to keep counting the number of rotations of a motor in order to detect the absolute angle of the rear wheel. Additionally, the backlash between the rack and pinion teeth in the rack and pinion mechanism may adversely affect the resolution and the detection accuracy.

SUMMARY OF THE INVENTION

It is an object of the present invention to provide a steering device that can precisely detect a movement amount of the steering shaft with high resolution.

According to an aspect of the present invention, there is provided a steering device, comprising: a housing including a housing body part, a steering shaft housing space, and a first restriction mechanism housing space, with the steering shaft housing space being provided inside the housing body part, and the first restriction mechanism housing space being provided in the housing body part and connected to the steering shaft housing space; a steering shaft having a bar shape, which, referring an axis which passes through a center of the steering shaft in a cross section perpendicular to a longitudinal direction of the steering shaft and is parallel to the longitudinal direction of the steering shaft as a first axis, is disposed inside the steering shaft housing space and moves in a direction of the first axis to allow steering of a steering wheel; a detection target, which, referring either the housing or the steering shaft as a first member and another as a second member, is attached to the first member; a displacement detection sensor attached to the second member and capable of outputting a signal according to a relative position change amount of the detection target with respect to the displacement detection sensor in the direction of the first axis; a first restriction mechanism provided in the first restriction mechanism housing space and restricting a relative movement of the detection target and the displacement detection sensor in a radial direction regarding the first axis, and an electric actuator for applying a steering force to the steering shaft based on an output signal of the displacement detection sensor.

Other objects and features of aspects of the present invention will be understood from the following description with reference to the accompanying drawings.

DESCRIPTION OF PREFERRED EMBODIMENTS

Figure 1:
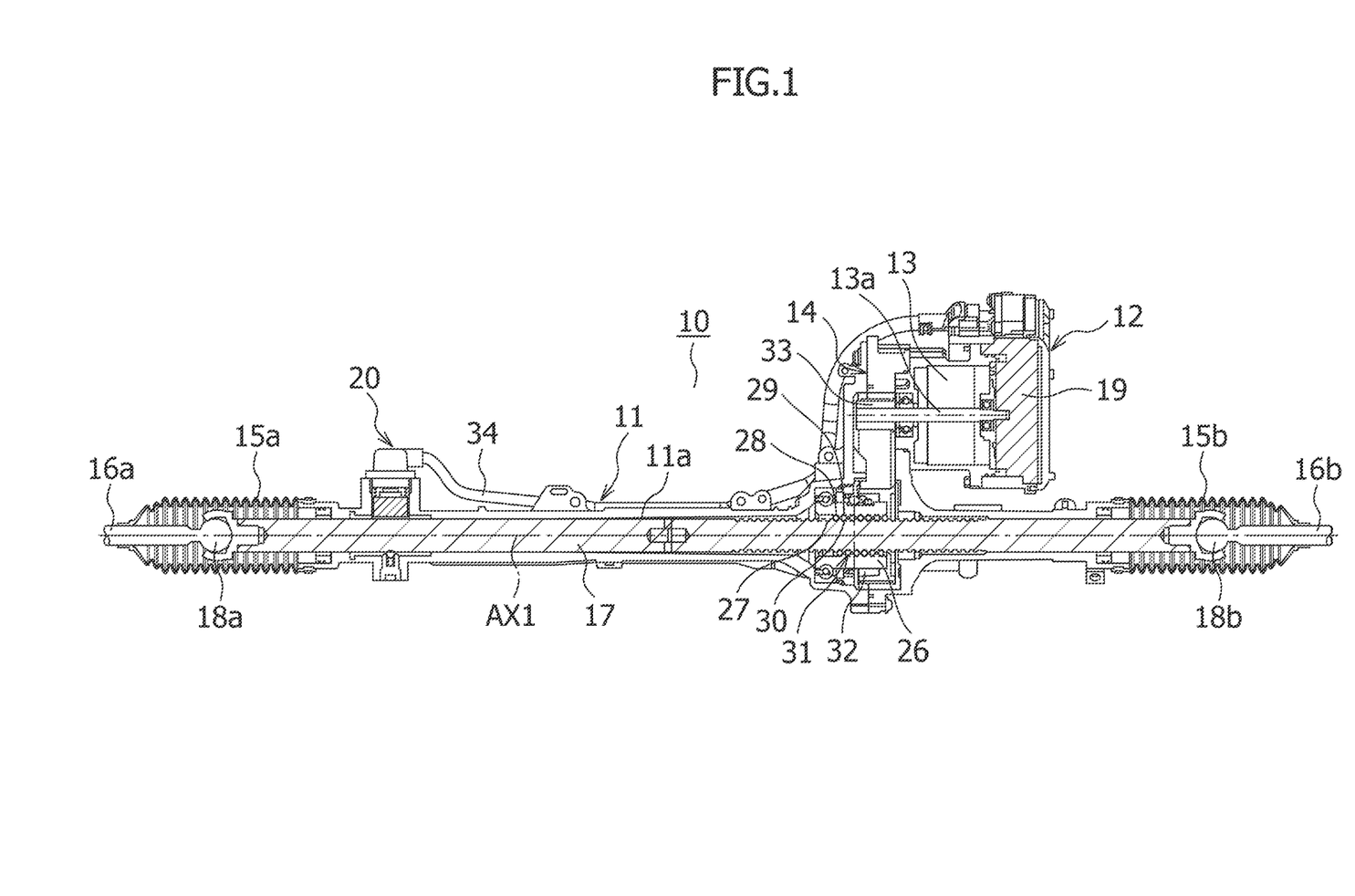
FIG. 1 illustrates a configuration example of a steering device according to a first embodiment of the present invention, and is a cross-sectional view cut along an axis of a steering shaft.

FIG. 1 illustrates a configuration example of the steering device according to the first embodiment of the present invention. A steering device 10 includes a rack housing 11, a motor housing 12, an electric motor 13 as an electric actuator, a reducer 14, dust boots 15a, 15b, tie rods 16a, 16b, a steering shaft 17, ball joints 18a, 18b, a displacement detection part 20, a ball screw mechanism 31 and the like.

Rack housing 11 has a substantially cylindrical shape, and has a steering shaft housing space 11a for housing steering shaft 17 having a bar shape, for example, a rack bar. Steering shaft 17 is provided (disposed) inside steering shaft housing space 11a, and moves in the direction of a first axis AX1 so as to enable steering of the steering wheel. Here, first axis AX1 passes through the center of steering shaft 17 in the cross section which is perpendicular to the longitudinal direction of steering shaft 17, and is parallel to the longitudinal direction of steering shaft 17.

The opposite ends of steering shaft 17 are respectively coupled to respective ones of the ends of tie rods 16a and 16b through ball joints 18a and 18b. These joint parts are covered with annular bellows-shaped dust boots 15a and 15b formed of rubber or the like. The vehicle width direction inner side ends of dust boots 15a and 15b are respectively fixed to opposite ends of rack housing 11, and the vehicle width direction outer side ends of dust boots 15a and 15b are fixed to the vehicle width direction inner side ends of tie rods 16a and 16b.

Motor housing 12 houses electric motor 13 and an Electronic Control Unit (ECU) 19 for controlling the Electric Power Steering (EPS). The rotation of electric motor 13 is reduced by reducer 14 and is transmitted to steering shaft 17 through ball screw mechanism 31. Ball screw mechanism 31 converts the rotational motion of electric motor 13 into the linear motion, and steering rod 17 moves in the direction of first axis AX1 so that the steering force is applied to the steering wheel from tie rods 16a and 16b respectively.

Ball screw mechanism 31 has a nut 26 and an output pulley 32. Output pulley 32 is a cylindrical member, and is integrally rotatably fixed to nut 26. A cylindrical input pulley 33 is fixed to a drive shaft 13a of electric motor 13 so that cylindrical input pulley 33 rotate integrally with drive shaft 13a. A belt (not illustrated) which is the transmission member is wound between input pulley 33 and output pulley 32. This transmission member is not limited to the belt but can also be the chain or the like. The driving force of electric motor 13 is transmitted to nut 26 through input pulley 33, the belt, and output pulley 32 respectively. Reducer 14 is constituted by input pulley 33, output pulley 32 and the belt, and the rotational speed of electric motor 13 is reduced and transmitted to nut 26.

Nut 26 is formed in the cylindrical shape to surround steering shaft 17, and is provided freely rotatable with respect to steering shaft 17. One end side of steering shaft 17 is supported by nut 26. The inner periphery of nut 26 forms a spiral groove, and this groove constitutes a nut-side ball screw groove 27. The outer periphery of steering shaft 17 forms a spiral groove, and this groove constitutes a steering shaft-side ball screw groove 28.

A ball circulation groove 29 is formed by nut-side ball screw groove 27 and steering shaft-side ball screw groove 28 in a state in which nut 26 is inserted into steering shaft 17. A plurality of balls 30 made of metal are filled in ball circulation groove 29. When nut 26 rotates, balls 30 move inside of ball circulation groove 29 so that steering shaft 17 moves in the longitudinal direction with respect to nut 26. The movement amount (stroke) of steering shaft 17 is detected by displacement detection part 20 and is input to ECU 19 for controlling the EPS through a harness 34.

Figure 2:
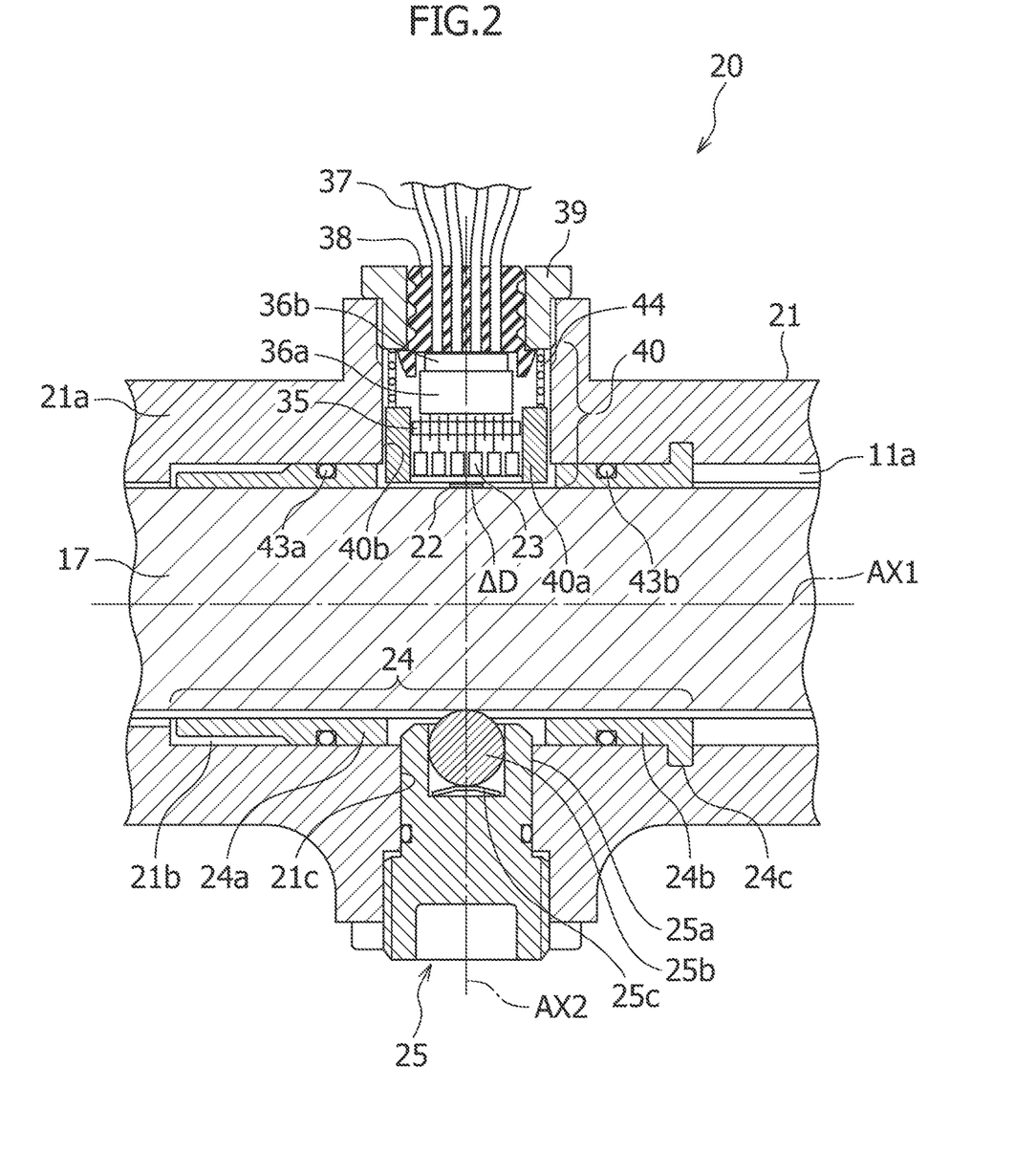
FIG. 2 is a cross-sectional view illustrating an enlarged configuration example of a displacement detection part in the steering device of FIG. 1.
Figure 3:
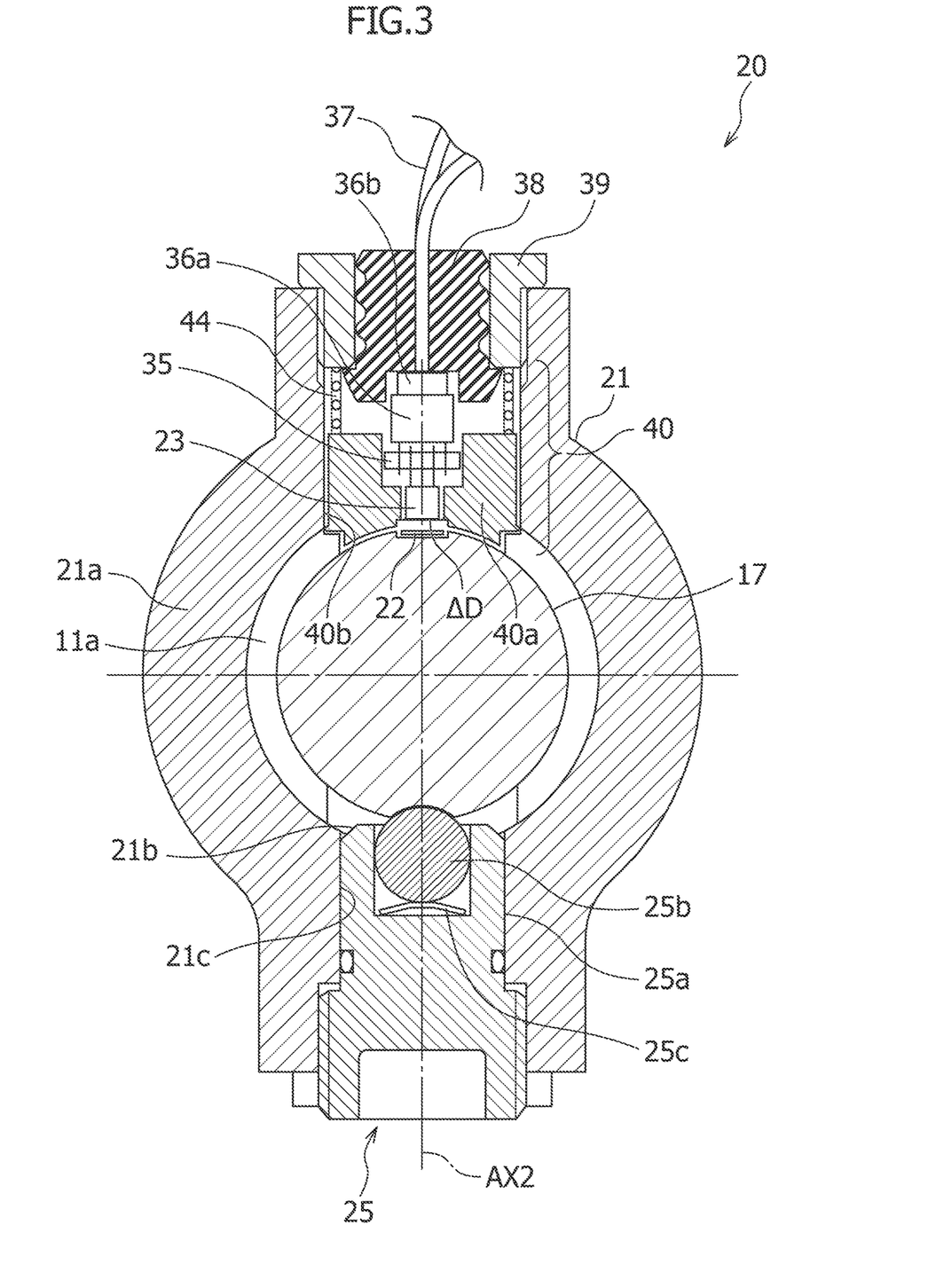
FIG. 3 is a cross-sectional view cut in a direction orthogonal to the axis of the steering shaft in the displacement detection part of FIG. 2.

FIGS. 2 and 3 are cross-sectional configuration views of displacement detection part 20 of steering device 10 which is illustrated in FIG. 1. FIG. 2 illustrates an enlarged configuration example of displacement detection part 20. FIG. 3 illustrates the cross section which is orthogonal to first axis AX1 parallel to the longitudinal direction of steering shaft 17 in displacement detection part 20 of FIG. 2 and along a second axis AX2 which passes through a displacement detection sensor 23.

Displacement detection part 20 includes a housing 21, a detection target 22, displacement detection sensor 23, a first restriction mechanism 24, and a second restriction mechanism 25. Housing 21 is constituted by forming a first restriction mechanism housing space 21b and a second restriction mechanism housing space 21c in a housing body part 21a. Additionally, steering shaft housing space 11a is formed inside of housing body part 21a, and first and second restriction mechanism housing spaces 21b and 21c are connected to steering shaft housing space 11a.

Housing 21 is provided with a following mechanism 40. Referring the axis orthogonal to first axis AX1 and passing through displacement detection sensor 23 as second axis AX2, following mechanism 40 has a holder 40a as a displacement detection sensor holding part for holding displacement detection sensor 23, displacement detection sensor 23 is movable such that displacement detection sensor 23 follows the movement in the direction of second axis AX2.

Additionally, housing 21 has a following mechanism holding part 40b for holding following mechanism 40. Following mechanism 40 includes a spring 44 as a following mechanism movable part, a grommet 38 as a following mechanism fixed part, and a waterproof plug 39. The following mechanism movable part relatively moves with respect to the following mechanism fixed part by the expansion and contraction of spring 44 in the direction of second axis AX2 so as to be capable of following the movement in the direction of second axis AX2. One end of spring 44 as the following mechanism movable part is held by holder 40a as the displacement detection sensor holding part, and the following mechanism fixed part can be incorporated into the inside of following mechanism holding part 40b while the following mechanism fixed part and displacement detection sensor 23 are in the assembled state in the following mechanism movable part.

In this example, detection target 22 is provided on (attached to) steering shaft 17, and displacement detection sensor 23 is provided in housing 21. Referring either housing 21 or steering shaft 17 as the first member and the other as the second member, detection target 22 may be provided (attached) to the first member, displacement detection sensor 23 may be provided (attached) to the second member, and displacement detection sensor 23 may be provided to face detection target 22 in the radial direction regarding first axis AX1.

Detection target 22 includes a magnetic body, and this magnetic body has the positional information in the direction of first axis AX1. Displacement detection sensor 23 is the magnetic sensor for detecting the positional information of the magnetic body. The magnetic sensor includes a detection element, and the detection element is coated with the insulating material.

Additionally, although not illustrated, housing 21 is provided with the cylindrical magnetic sensor holder for holding the magnetic sensor. The magnetic sensor holder is formed of a nonmagnetic material such as resin, and has the magnetic sensor holding part for holding the magnetic sensor. The magnetic sensor holder is coated with the insulating material.

More specifically, detection target 22 is the magnetic tape attached to the inner surface of the groove formed on the surface of steering shaft 17, for example, and the information for sensing the stroke is recorded by arranging the N pole and the S pole alternatingly in the form of a barcode by magnetization. When the absolute stroke position is desired to be detected, the pattern for sensing the absolute position called the M-code can also be used. On the other hand, for displacement detection sensor 23, the Hall IC (magnetoelectric conversion element) can be used, in which by utilizing the Hall effect, the quantity of magnetism recorded on a magnetic tape is converted into the quantity of electricity and read. The information recorded in the form of a bar code is read by a plurality of Hall ICs to sense the stroke. Here, six Hall ICs are arranged at equal intervals in the direction of first axis AX1 and mounted on a printed circuit board 35; however, the number and the installation interval of Hall ICs may be set according to the resolution and length to be read.

A connector 36a is installed on printed circuit board 35. One end of a lead wire 37 of displacement detection sensor 23 is connected with connector 36a by means of a connector 36b, and the other end of lead wire 37 penetrates through the inside of rubber grommet 38 and is led to the outside. The other end of lead wire 37 is connected with ECU 19 for controlling the EPS through external harness 34. Furthermore, rubber waterproof plug 39 is provided around grommet 38 in order to waterproof the mounting portion of printed circuit board 35 and displacement detection sensor 23. This waterproof plug 39 is the screw cap when assembled from the outside.

Displacement detection sensor 23 is provided with a gap $\Delta D$ having the first length with respect to detection target 22 in the radial direction regarding first axis AX1. First restriction mechanism 24 (out of first and second bush parts 24a and 24b, corresponding to second bush part 24b in the present example) has a support surface 24c for supporting steering shaft 17. Support surface 24c is provided movably to housing 21 by the second length which is shorter than the first length in the radial direction regarding first axis AX1.

Detection target 22 is movable by a predetermined amount with respect to housing 21 in the direction of second axis AX2. Following mechanism 40 includes the following mechanism movable part (spring 44) and the following mechanism fixed part (grommet 38 and waterproof plug 39). The following mechanism fixed part is fixed to housing 21. The following mechanism moveable part is relatively movable with respect to the following mechanism fixed part in the direction of second axis AX2. The relatively movable distance of the following mechanism movable part with respect to the following mechanism fixed part is longer than the movable distance of detection target 22 with respect to housing 21 in the direction of second axis AX2.

First restriction mechanism 24 is provided in first restriction mechanism housing space 21b, and restricts the relative movement of detection target 22 and displacement detection sensor 23 in the radial direction regarding first axis AX1. Specifically, first restriction mechanism 24 restricts the relative movement of steering shaft 17 with respect to housing 21 in the first axis AX1 direction of steering shaft 17. In this example, first restriction mechanism 24 is first and second bush parts 24a and 24b which are made of resin. Second bush part 24b has support surface 24c for supporting the other end side of steering shaft 17. O-rings 43a and 43b are equipped between the outer circumferences of first and second bush parts 24a and 24b and first restriction mechanism housing space 21b. O-rings 43a and 43b are provided in the state of being compressed by first and second bush parts 24a and 24b and housing body part 21a in the radial direction regarding first axis AX1.

Here, the bush means the cylindrical or donut-shaped mechanical component which is fitted to a shaft, a tubular member or the like, and is used for filling a gap or for buffering.

Displacement detection sensor 23 is provided between bush part (first bush part) 24a and bush part (second bush part) 24b in the direction of first axis AX1. Thus, in order to measure the movement amount of steering shaft 17 with high resolution and high accuracy, displacement detection sensor 23 is provided at the portion where rattling and deflection least likely to occur in the support part on the other end side of steering shaft 17. Furthermore, bush parts 24a and 24b are provided to avoid interference with detection target 22 or displacement detection sensor 23 provided on steering shaft 17. In regard to bush parts 24a and 24b, the inner diameter regarding first axis AX1 in a state in which steering shaft 17 is not inserted into bush part 24a or 24b is smaller than the inner diameter in a state in which steering shaft 17 is inserted into the bush parts.

Steering shaft 17 is supported by bush parts 24a and 24b. As for the rattle of steering shaft 17, it is inevitable for steering shat 17 to move inside, and a bending moment may be introduced by an external force. Therefore, in order to follow the movement of the rattle and the bending moment, the portion where displacement detection sensor 23 and printed circuit board 35 are provided is the floating structure in which steering shaft 17 is pressed by spring 44. For this reason, since displacement detection sensor 23 is always pressed to the cylinder surface of steering shaft 17, gap ΔD between detection target 22 and displacement detection sensor 23 is always maintained constant. Displacement detection sensor 23 and connector 36a are fixed to printed circuit board 35. These components move in unison and retract a lead wire 37 at the time of moving; however, the movement is slight since only the amount of gap between bush parts 24a, 24b is moved. Additionally, the amount of movement due to pressing by spring 44 can be absorbed by lead wire 37 and grommet 38.

In order to avoid interference between detection target 22 or displacement detection sensor 23 and bush parts 24a, 24b, bush parts 24a, 24b may be provided with a recess or a notch, for example. Alternatively, bush parts 24a and 24b may be formed to be arc-shaped in cross section, and detection target 22 or displacement detection sensor 23 may be located at the arc-shaped notch portion.

Second restriction mechanism 25 is provided on the opposite side of displacement detection sensor 23 on a plane perpendicular to first axis AX1 where first axis AX1 is taken as the center of symmetry. Displacement detection sensor 23 can output the signal according to the relative position change amount of detection target 22 with respect to displacement detection sensor 23 in the direction of first axis AX1. This signal is input to ECU 19 for controlling the EPS. Then, electric motor 13 is driven and controlled based on the output signal of displacement detection sensor 23, and the driving force is transmitted to steering shaft 17 through ball screw mechanism 31 to apply the steering force.

Second restriction mechanism 25 restricts the relative rotation of steering shaft 17 regarding first axis AX1 with respect to housing 21. Second restriction mechanism 25 is a ball plunger including a guide member 25a, a ball-shaped second restriction mechanism contact part, and a second restriction mechanism energization part. Guide member 25a is provided in housing body part 21a, and is inserted into second restriction mechanism housing space 21c that is connected to steering shaft housing space 11a. The second restriction mechanism contact part is a ball-shaped member 25b, and a plate spring 25c as the second restriction mechanism energization part enables ball-shaped member 25b to contact the flat surface provided on the outer peripheral side of steering shaft 17. Second restriction mechanism energization part energizes the second restriction mechanism contact part toward steering shaft 17 in the radial direction regarding first axis AX1, and presses it into the recessed groove corresponding to ball-shaped member 25b that is formed on the outer peripheral surface of steering shaft 17. As a result, second restriction mechanism energization part restricts the relative rotation of steering shaft 17 regarding first axis AX1 with respect to housing 21.

Various methods can be considered to stop rotation of steering shaft 17. For example, steering shaft 17 can be D-shaped in cross section, and a bush member or the like can be pressed against the flat surface to suppress rotation.

Second restriction mechanism 25 may be the pinion shaft having the pinion teeth that mesh with the rack teeth. In the case of rack and pinion, the meshing of the teeth itself prevents the rotation of steering shaft 17.

Figure 4:
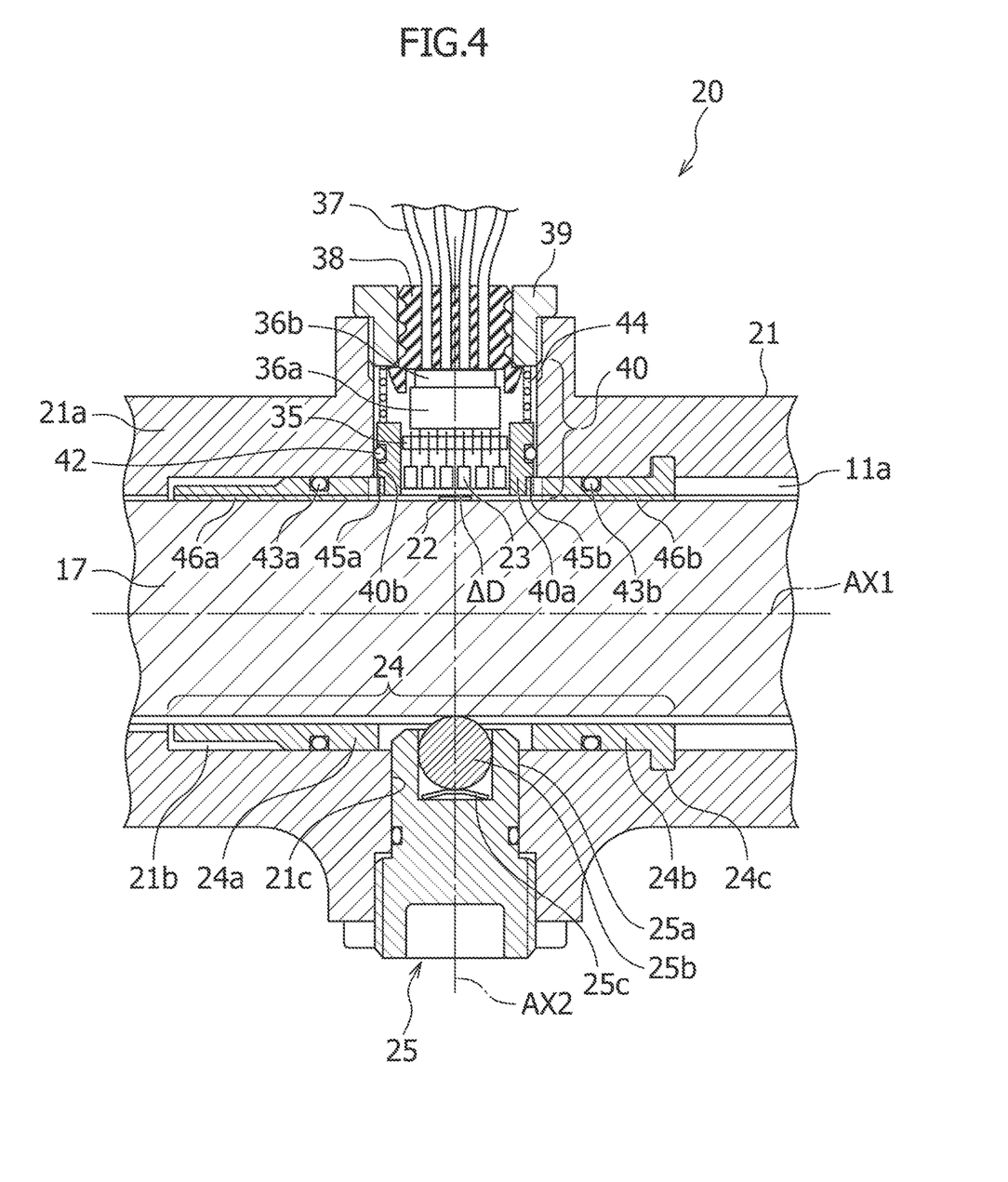
FIG. 4 is a cross-sectional view illustrating another enlarged configuration example of the displacement detection part in the steering device of FIG. 1.
Figure 5:
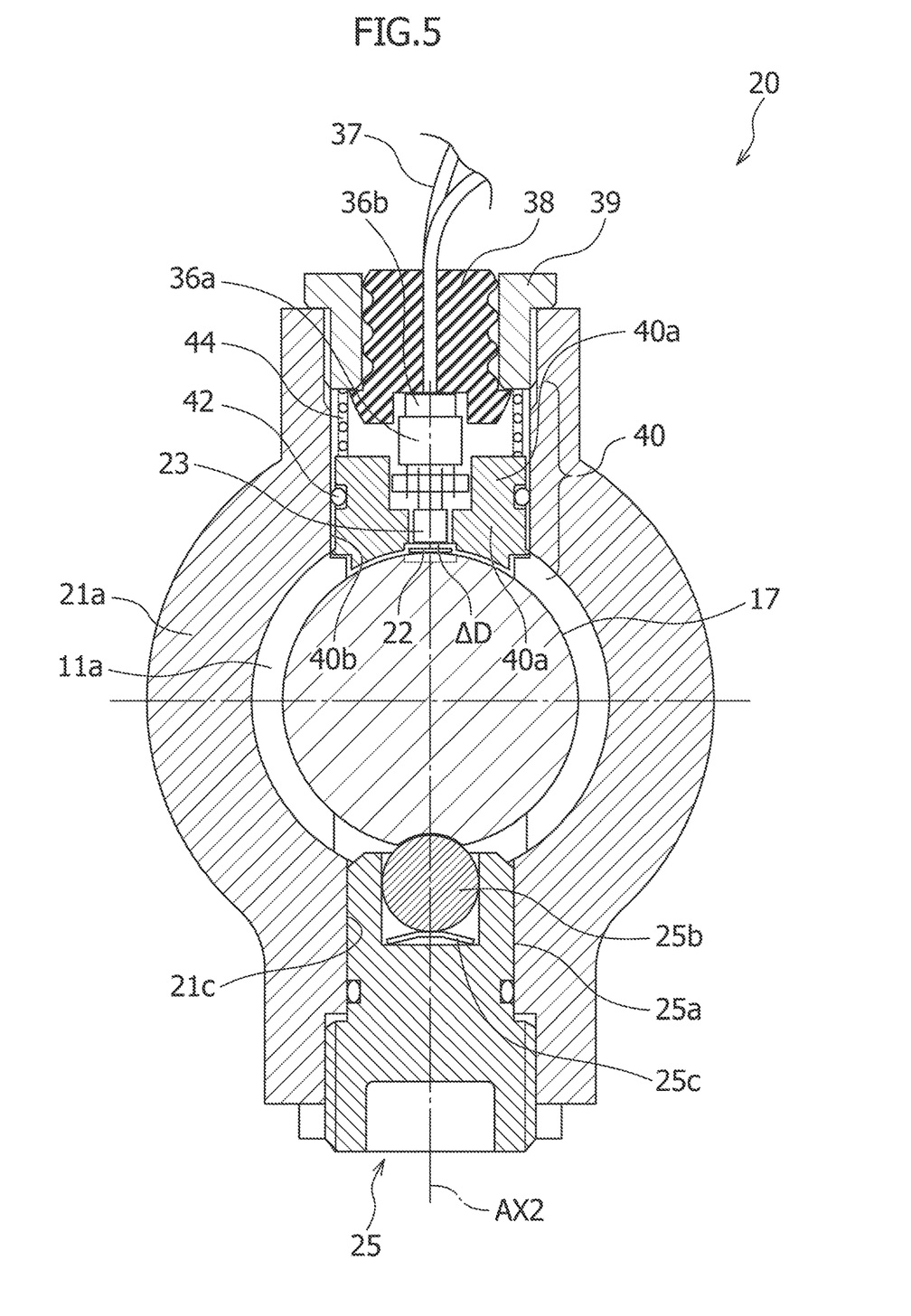
FIG. 5 is a cross-sectional view cut in a direction orthogonal to the axis of the steering shaft in the displacement detection part of FIG. 4.

FIGS. 4 and 5 are cross-sectional views showing other configuration examples in the vicinity of displacement detection part 20 in steering device of FIG. 1. FIG. 4 illustrates an enlarged configuration example of displacement detection part 20. FIG. 5 illustrates the cross section which is orthogonal to first axis AX1 parallel to the longitudinal direction of steering shaft 17 in displacement detection part 20 of FIG. 4 and along second axis AX2 which passes through displacement detection sensor 23. The configurations of FIGS. 4 and 5 are basically the same as FIGS. 2 and 3. Thus, the same reference numerals are given to the same components as those shown in FIGS. 2 and 3, and the detailed description will be omitted.

Displacement detection part 20 in the present example has the third restriction mechanism (holder 40a and an O-ring 42). O-ring 42 is interposed between holder 40a as the displacement detection sensor holding part for holding displacement detection sensor 23 and housing body part 21a, and restricts the relative movement of displacement detection sensor 23 with respect to housing 21 in the radial direction regarding second axis AX2.

First restriction mechanism 24 is first and second bush parts 24a and 24b which restrict the relative movement of steering shaft 17 with respect to housing 21 in the radial direction regarding first axis AX1. First and Second bush parts 24a and 24b have third-restriction-mechanism second-axial-direction position restricting parts 45a and 45b. The third restriction mechanism contacts third-restriction-mechanism second-axial-direction position restricting parts 45a, 45b so that third-restriction-mechanism second-axial-direction position restricting parts 45a, 45b hold the third restriction mechanism at a predetermined position in the direction of second axis AX2.

In the present example, clearance grooves 46a and 46b are formed between first and second bush parts 24a and 24b and steering shaft 17.

The clearance (gap) must be provided in the lateral direction in order to move printed circuit board 35 and the magnetic sensor holder. In this state, when steering shaft 17 moves, deviation occurs by the amount of gap, and thus, when steering shaft 17 moves in the reverse direction, there may be a moment where the movement cannot be detected.

However, the occurrence of rattling can be suppressed by providing O-ring 42 on the outer peripheral portion of holder 40a. Additionally, by providing O-ring 42, detailed sensing of the movement amount is possible at the timing of quick turn.

Figure 6:
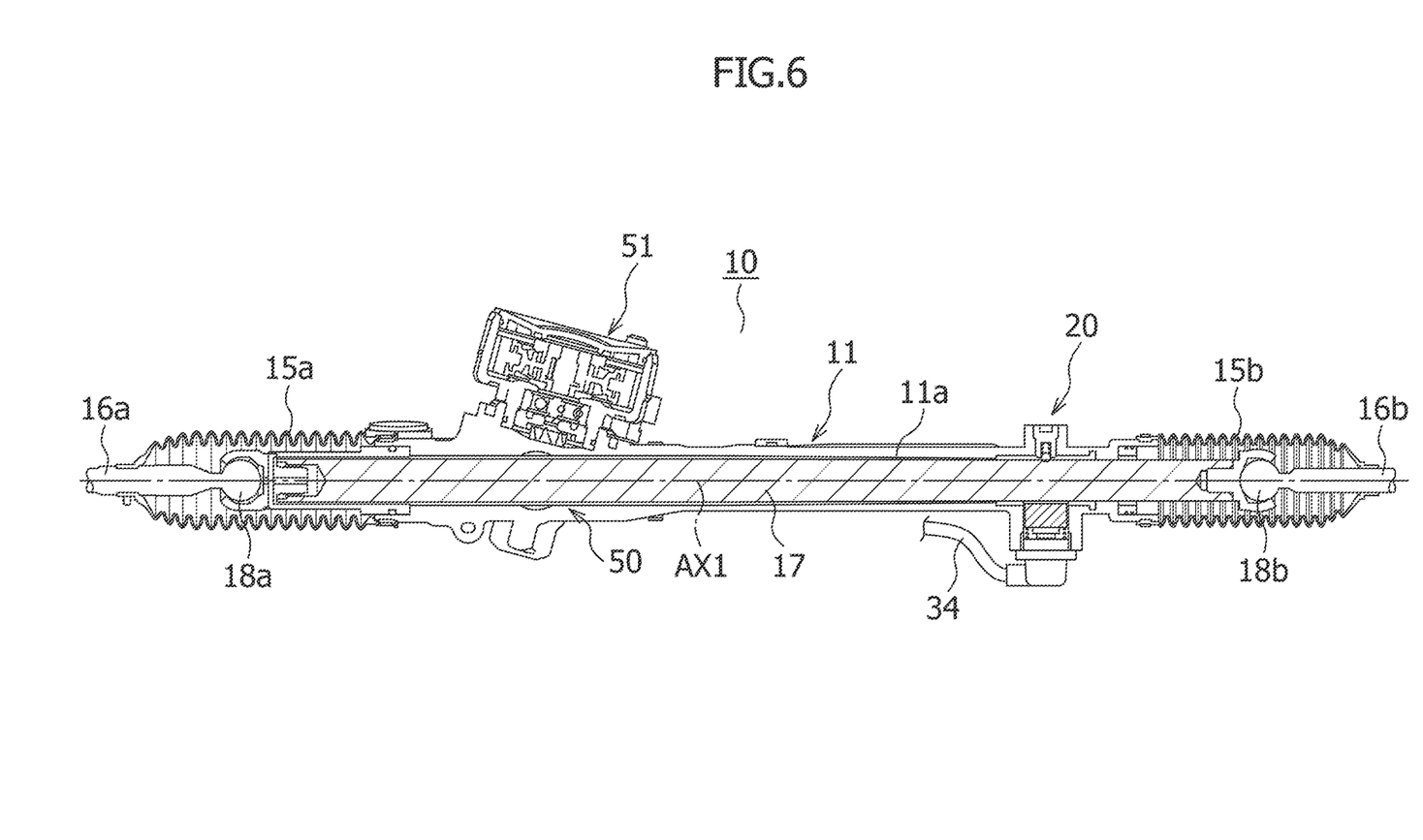
FIG. 6 illustrates a configuration example of a steering device according to a second embodiment of the present invention, and is a cross-sectional view cut along an axis of a steering shaft.

FIG. 6 is the cross-sectional view illustrating the configuration example of the steering device according to the second embodiment of the present invention. Steering device 10 uses the reducer to reduce the rotational motion of an electric motor 51 as the electric actuator, and converts the rotational motion into the linear motion by means of a rack and pinion mechanism 50 to apply the steering force to steering shaft 17. Although not illustrated, steering shaft 17 has the rack tooth forming part in which rack teeth are formed, and the pinion shaft having pinion teeth meshing with the rack teeth functions as second restriction mechanism 25.

Other basic configurations are the same as FIG. 1. Thus, the same reference numerals are given to the same components as those shown in FIG. 1, and detailed description will be omitted.

According to the above configuration, the rack teeth of steering shaft 17 and the pinion teeth of the pinion shaft mesh with each other, thereby restricting the rotation of one end side of steering shaft 17. By supporting steering shaft 17 at displacement detection part 20 provided on the other end side of steering shaft 17 which is distant from rack and pinion mechanism 50, the movement amount (stroke) of steering shaft 17 can be detected in the state where rattling and deflection least likely to occur. Also, the steering device according to the second embodiment can suppress the increase in the number of components.

Here, the technical ideas that may be grasped from the first and second embodiments described above will be described with their effects.

In one aspect, steering device 10 has: housing 21 including housing body part 21a, steering shaft housing space 11a and first restriction mechanism housing space 21b, steering shaft housing space 11a provided inside housing body part 21a, and first restriction mechanism housing space 21b provided in housing body part 21a and connected to steering shaft housing space 11a;

steering shaft 17 having a bar shape, which, referring the axis which passes through the center of steering shaft 17 in the cross section perpendicular to the longitudinal direction of steering shaft 17 and is parallel to the longitudinal direction of steering shaft 17 as first axis AX1, steering shaft 17 is provided inside steering shaft housing space 11a and moves in the direction of first axis AX1 to allow steering of the steering wheel;

detection target 22, which, referring either housing 21 or steering shaft 17 as the first member and the other as the second member, detection target 22 is provided to the first member;

displacement detection sensor 23 provided to the second member and capable of outputting a signal according to the relative position change amount of detection target 22 with respect to displacement detection sensor 23 in the direction of first axis AX1, first restriction mechanism 24 provided in first restriction mechanism housing space 21b and restricting the relative movement of detection target 22 and displacement detection sensor 23 in the radial direction regarding first axis AX1, and the electric actuator (electric motor 13) for applying the steering force to steering shaft 17 based on the output signal of displacement detection sensor 23.

Steering shaft 17 may have predetermined radial rattling with respect to housing 21. In addition, steering shaft 17 may be bent or displaced inside of housing 21 which resulted from the input from the electric actuator or the steering wheel. Due to these causes, the relative position in the radial direction of detection target 22 and displacement detection sensor 23 changes. The change in the relative position in the radial direction affects the detection accuracy of displacement detection sensor 23, which may lead to deterioration in steering performance.

According to the above configuration, first restriction mechanism 24 restricts the change in the relative position in the radial direction of detection target 22 and displacement detection sensor 23, so that the decrease in the detection accuracy of displacement detection sensor 23 can be suppressed.

In a preferable aspect of steering device 10, first restriction mechanism 24 restricts the relative movement of steering shaft 17 with respect to housing 21 in the radial direction regarding first axis AX1.

According to the above configuration, even if detection target 22 or displacement detection sensor 23 is fixed to steering shaft 17, the relative position change in the radial direction of detection target 22 and displacement detection sensor 23 can be limited by restricting the movement in the radial direction of steering shaft 17 itself.

Furthermore, in another preferable aspect, in steering device 10, first restriction mechanism 24 is a bush, and the bush has support surface 24c for supporting steering shaft 17.

According to the above configuration, the positional deviation of steering shaft 17 can be suppressed by the simple configuration.

In still another preferred aspect, detection target 22 is provided on steering shaft 17, and displacement detection sensor 23 is provided in housing 21. The bush includes first bush part 24a and second bush part 24b, and displacement detection sensor 23 is provided between first bush part 24a and second bush part 24b in the direction of first axis AX1.

According to the above configuration, the portion in detection target 22 which is detected by displacement detection sensor 23 is stably supported by supporting steering shaft 17 from opposite sides of displacement detection sensor 23, and therefore, the detection accuracy can be improved.

In still another preferred aspect, the bush is provided to avoid interference with detection target 22 or displacement detection sensor 23 provided on steering shaft 17.

According to the above configuration, the bush relatively slides with steering shaft 17, and thus, detection target 22 or displacement detection sensor 23 provided on steering shaft 17 may interfere with the bush. Therefore, the above configuration can avoid the interference between them.

In still another preferred aspect, first restriction mechanism 24 includes O-rings 43a and 43b, and O-rings 43a and 43b are provided in the compressed state between the bush (first restriction mechanism 24) and housing 21 in the radial direction regarding first axis AX1.

According to the above configuration, O-rings 43a and 43b can mitigate the vibration of steering shaft 17 so that the detection accuracy of displacement detection sensor 23 can be improved.

In still another preferred aspect, the inner diameter of the bush regarding first axis AX1 in a state in which steering shaft 17 is not inserted into the bush is smaller than the inner diameter in a state in which steering shaft 17 is inserted into the bush.

According to the above configuration, there is no radial rattling between the bush and steering shaft 17, which is in a state of having a so-called fastening margin, and thus, steering shaft 17 can be stably supported.

In still another preferred aspect, displacement detection sensor 23 is provided through the gap having the first length with respect to detection target 22 in the radial direction regarding first axis AX1. First restriction mechanism 24 has support surface 24c for supporting steering shaft 17. Support surface 24c is provided movably to housing 21 by the second length which is shorter than the first length in the radial direction regarding first axis AX1.

According to the above configuration, supporting surface 24c of first restriction mechanism 24 is movable in the radial direction so that a predetermined amount of displacement and bending of steering shaft 17 can be accepted, and the local generation of internal stress can be suppressed. The maximum amount of displacement of support surface 24c at this time is shorter than the length of the gap between detection target 22 and displacement detection sensor 23. Therefore, even when steering shaft 17 is displaced to the maximum amount, the interference between detection target 22 and displacement detection sensor 23 can be suppressed.

In still another preferred aspect, steering device 10 has second restriction mechanism 25. Second restriction mechanism 25 is provided in housing 21, and restricts the relative rotation of steering shaft 17 regarding first axis AX1 with respect to housing 21.

According to the above configuration, the decrease in the detection accuracy of displacement detection sensor 23 resulted from the relative rotation of steering shaft 17 with respect to housing 21 can be suppressed.

In still another preferred aspect, steering shaft 17 has a rack tooth forming part in which rack teeth are formed, and second restriction mechanism 25 is the pinion shaft having the pinion teeth that mesh with the rack teeth.

According to the above configuration, the rack teeth of steering shaft 17 and the pinion teeth of the pinion shaft mesh with each other, thereby restricting the rotation of one end side of steering shaft 17. Additionally, for example, applying the steering force of the electric actuator to steering shaft 17 through rack and pinion mechanism 50 can suppress the increase in the number of components.

In still another preferred aspect, second restriction mechanism 25 includes the second restriction mechanism contact part and the second restriction mechanism energization part. The second restriction mechanism contact part is capable of contacting steering shaft 17. The second restriction mechanism energization part energizes the second restriction mechanism contact part toward steering shaft 17 in the radial direction regarding first axis AX1 to restrict the relative rotation of steering shaft 17 regarding first axis AX1 with respect to housing 21.

According to the above configuration, the second restriction mechanism contact part is energized toward steering shaft 17 to contact steering shaft 17 so that the rotation of steering shaft 17 can be restricted. By providing second restriction mechanism 25, the rotation of steering shaft 17 can be restricted even if reducer 14 provided between steering shaft 17 and electric actuator is like, for example, ball screw mechanism 31 that cannot restrict the rotation of steering shaft 17.

In still another preferred aspect, displacement detection sensor 23 is provided to face detection target 22 in the radial direction regarding first axis AX1. Second restriction mechanism 25 is provided on the opposite side of displacement detection sensor 23 on a plane perpendicular to first axis AX1 where first axis AX1 is taken as the center of symmetry.

According to the above configuration, the energizing direction of second restriction mechanism energization part coincides with the direction in which detection target 22 and displacement detection sensor 23 face each other. Therefore, not only is the rotation of steering shaft 17 restricted, but the displacement in the relative position in the radial direction of detection target 22 and displacement detection sensor 23 can also be suppressed.

In still another preferred aspect, detection target 22 includes a magnetic body, and the magnetic body has the positional information in the direction of first axis AX1. Additionally, displacement detection sensor 23 is the magnetic sensor (Hall ICs) for detecting the positional information of the magnetic body.

According to the above configuration, displacement detection sensor 23 can contactlessly detect the positional information of detection target 22. Additionally, displacement detection sensor 23 is more resistant to dirt such as grease as compared to the optical sensor.

In still another preferred aspect, the steering device has the magnetic sensor holder, and detection target 22 is provided on steering shaft 17. The magnetic sensor holder is provided in housing 21, formed of a nonmagnetic material, and has the magnetic sensor holding part for holding the magnetic sensor.

According to the above configuration, for example, the magnetic sensor is assembled to the magnetic sensor holder in advance to be in subassembly form, and the subassembly is assembled to housing 21, so that the assemblability can be improved. Additionally, since the magnetic sensor holder is formed of a nonmagnetic material, the influence on the detection accuracy of the magnetic sensor can be suppressed.

In still another preferred aspect, the magnetic sensor holder is coated with an insulating material.

According to the above configuration, if, for example, the magnetic sensor holder is formed of aluminum or copper, when detection target 22 and the magnetic sensor holder relatively move at high speed, an eddy current may be generated. The eddy current may affect the detection accuracy of displacement detection sensor 23. Then, the generation of eddy current can be suppressed by coating the magnetic sensor holder with the insulating material.

In still another preferred aspect, the magnetic sensor includes a detection element, and the detection element is coated with an insulating material.

According to the above configuration, the detected element can be protected from the abrasion powder, grease and the like of steering shaft 17.

In still another preferred aspect, the steering device has the third restriction mechanism (holder 40a, or holder 40a and O-ring 42), and detection target 22 is provided on steering shaft 17. Referring the axis orthogonal to first axis AX1 and passing through displacement detection sensor 23 as a second axis AX2, the third restriction mechanism is provided in housing 21, has a displacement detection sensor holding part for holding displacement detection sensor 23, and restricts the relative movement of displacement detection sensor 23 with respect to housing 21 in the radial direction regarding second axis AX2.

According to the above configuration, the decrease in the detection accuracy of displacement detection sensor 23 due to radial rattling regarding second axis AX2 of displacement detection sensor 23 can be suppressed.

In still another preferred aspect, first restriction mechanism 24 is the bush for restricting the relative movement of steering shaft 17 with respect to housing 21 in the radial direction regarding first axis AX1. The bush has third-restriction-mechanism second-axial-direction position restricting parts 45a and 45b, and the third restriction mechanism contacts third-restriction-mechanism second-axial-direction position restricting parts 45a, 45b so that third-restriction-mechanism second-axial-direction position restricting parts 45a and 45b hold the third restriction mechanism at a predetermined position in the direction of second axis AX2.

According to the above configuration, the positioning of the third restriction mechanism in the direction of second axis AX2 is facilitated.

In still another preferred aspect, detection target 22 is provided on steering shaft 17, and displacement detection sensor 23 is provided in housing 21.

According to the above configuration, although displacement detection sensor 23 needs to provide wiring (lead wire 37) for supplying power and outputting the signal, connecting and handling of the wiring are facilitated by providing displacement detection sensor 23 in housing 21 which does not relatively move with respect to the vehicle.

In still another preferred aspect, the steering device has following mechanism 40, which, referring the axis orthogonal to first axis AX1 and passing through displacement detection sensor 23 as a second axis AX2, following mechanism 40 is provided in housing 21, and has a displacement detection sensor holding part for holding displacement detection sensor 23. Displacement detection sensor 23 is movable such that displacement detection sensor 23 follows the movement in the direction of second axis AX2 of steering shaft 17.

According to the above configuration, displacement detection sensor 23 is moved to follow the displacement of steering shaft 17 on which detection target 22 is provided in the direction of second axis AX2 so that the relative position deviation of detection target 22 and displacement detection sensor 23 can further be suppressed.

In still another preferred aspect, housing 21 has following mechanism holding part 40b for holding following mechanism 40, and holding following mechanism 40 includes the following mechanism movable part (spring 44) and the following mechanism fixed part (grommet 38 and waterproof plug 39). The following mechanism movable part relatively moves with respect to the following mechanism fixed part in the direction of second axis AX2 so as to be capable of following the movement in the direction of second axis AX2 of steering shaft 17. The displacement detection sensor holding part (holder 40a) is provided on the following mechanism movable part. The following mechanism fixed part can be incorporated into following mechanism holding part 40b in the state in which the following mechanism fixed part and displacement detection sensor 23 are in the assembled state in the following mechanism movable part.

According to the above configuration, the following mechanism fixed part and displacement detection sensor 23 are assembled to the following mechanism movable part in advance to be in subassembly form, and the subassembly is assembled to housing 21, so that the assemblability can be improved.

In still another preferred aspect, detection target 22 is movable by a predetermined amount with respect to housing 21 in the direction of second axis AX2, and following mechanism 40 includes the following mechanism movable part and the following mechanism fixed part. The following mechanism fixed part is fixed to housing 21. The following mechanism moveable part is relatively movable with respect to the following mechanism fixed part in the direction of second axis AX2, and the relative movable distance of the following mechanism movable part with respect to the following mechanism fixed part is longer than the movable distance of detection target 22 with respect to housing 21 in the direction of second axis AX2.

According to the above configuration, even if steering shaft 17 is moved to the maximum extent with respect to housing 21, the following mechanism movable part can follow the movement of steering shaft 17, and can suppress the interference and the like between detection target 22 and displacement detection sensor 23.

The present invention provides the displacement detection sensor on either the housing or the steering shaft and provides the detection target on the other, and outputs the signal according to the relative position change amount of the detection target in the direction of first axis AX1 from the displacement detection sensor so as to detect the movement amount of the steering shaft. At this time, the first restriction mechanism restricts radial rattling with respect to the housing of the steering shaft, or the change in the relative position in the radial direction of the detection target and the displacement detection sensor which is generated by the displacement within the housing due to bending of the steering shaft resulted from the input from the electric actuator or the steering wheel, and thus, the decrease in the detection accuracy can be suppressed.

Therefore, according to the present invention, the steering device that can precisely detect the movement amount of the steering shaft with high resolution can be obtained.

The entire contents of Japanese Patent Application No. 2018-169518 filed on Sep. 11, 2018, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A steering device comprising:
    a housing including a housing body part, a steering shaft housing space, and a first restriction mechanism housing space, with the steering shaft housing space being provided inside the housing body part, and the first restriction mechanism housing space being provided in the housing body part and connected to the steering shaft housing space;
    a steering shaft having a bar shape, which, referring an axis which passes through a center of the steering shaft in a cross section perpendicular to a longitudinal direction of the steering shaft and is parallel to the longitudinal direction of the steering shaft as a first axis, is disposed inside the steering shaft housing space and moves in a direction of the first axis to allow steering of a steering wheel;
    a detection target, which, referring either the housing or the steering shaft as a first member and another as a second member, is attached to the first member;
    a displacement detection sensor attached to the second member and capable of outputting a signal according to a relative position change amount of the detection target with respect to the displacement detection sensor in the direction of the first axis;
    a first restriction mechanism provided in the first restriction mechanism housing space and restricting a relative movement of the detection target and the displacement detection sensor in a radial direction regarding the first axis, and
    an electric actuator for applying a steering force to the steering shaft based on an output signal of the displacement detection sensor.

2. The steering device according to claim 1, wherein the first restriction mechanism restricts a relative movement of the steering shaft with respect to the housing in the radial direction regarding the first axis.

3. The steering device according to claim 2, wherein the first restriction mechanism is a bush, and
    the bush has a support surface for supporting the steering shaft.

4. The steering device according to claim 3, wherein the detection target is attached to the steering shaft,
    the displacement detection sensor is provided in the housing,
    the bush includes a first bush part and a second bush part, and
    the displacement detection sensor is provided between the first bush part and the second bush part in the direction of the first axis.

5. The steering device according to claim 3, wherein the bush is provided to avoid interference with the detection target or the displacement detection sensor provided on the steering device.

6. The steering device according to claim 3, wherein the first restriction mechanism includes an O-ring, and
    the O-ring is provided in a compressed state between the bush and the housing in the radial direction regarding the first axis.

7. The steering device according to claim 3, wherein an inner diameter of the bush regarding the first axis in a state in which the steering shaft is not inserted into the bush is smaller than the inner diameter in a state in which the steering shaft is inserted into the bush.

8. The steering device according to claim 2, wherein the displacement detection sensor is provided through a gap having a first length with respect to the detection target in the radial direction regarding the first axis,
    the first restriction mechanism has a support surface for supporting the steering shaft, and
    the support surface is provided movably to the housing by a second length which is shorter than the first length in the radial direction regarding the first axis.

9. The steering device according to claim 1, further comprising a second restriction mechanism, wherein
    the second restriction mechanism is provided in the housing, and restricts the relative rotation of the steering shaft regarding the first axis with respect to the housing.

10. The steering device according to claim 9, wherein the steering shaft has a rack tooth forming part in which rack teeth are formed, and
    the second restriction mechanism is a pinion shaft having pinion teeth that mesh with the rack teeth.

11. The steering device according to claim 9, wherein the second restriction mechanism includes a second restriction mechanism contact part and a second restriction mechanism energization part,
    the second restriction mechanism contact part is capable of contacting the steering shaft, and
    the second restriction mechanism energization part energizes the second restriction mechanism contact part toward the steering shaft in the radial direction regarding the first axis to restrict the relative rotation of the steering shaft regarding the first axis with respect to the housing.

12. The steering device according to claim 11, wherein the displacement detection sensor is provided to face the detection target in the radial direction regarding the first axis, and
    the second restriction mechanism is provided on an opposite side of the displacement detection sensor on a plane perpendicular to the first axis where the first axis is taken as a center of symmetry.

13. The steering device according to claim 1, wherein the detection target includes a magnetic body,
    the magnetic body has positional information in the direction of the first axis, and
    the displacement detection sensor is a magnetic sensor for detecting the positional information of the magnetic body.

14. The steering device according to claim 13, further comprising a magnetic sensor holder, wherein
    the detection target is attached to the steering shaft, and
    the magnetic sensor holder is provided in the housing, formed of a nonmagnetic material, and has a magnetic sensor holding part for holding the magnetic sensor.

15. The steering device according to claim 14, wherein the magnetic sensor holder is coated with an insulating material.

16. The steering device according to claim 14, wherein the magnetic sensor includes a detection element, and the detection element is coated with an insulating material.

17. The steering device according to claim 1, further comprising a third restriction mechanism, wherein
    the detection target is attached to the steering shaft, and
    referring an axis orthogonal to the first axis and passing through the displacement detection sensor as a second axis, the third restriction mechanism is provided in the housing, has a displacement detection sensor holding part for holding the displacement detection sensor, and restricts the relative movement of the displacement detection sensor with respect to the housing in the radial direction regarding the second axis.

18. The steering device according to claim 17, wherein the first restriction mechanism is a bush for restricting the relative movement of the steering shaft with respect to the housing in the radial direction regarding the first axis, the bush has a third-restriction-mechanism second-axial-direction position restricting part, and the third restriction mechanism contacts the third-restriction-mechanism second-axial-direction position restricting part so that the third-restriction-mechanism second-axial-direction position restricting part holds the third restriction mechanism at a predetermined position in the direction of the second axis.

19. The steering device according to claim 1, wherein the detection target is attached to the steering shaft, and the displacement detection sensor is provided in the housing.

20. The steering device according to claim 19, further comprising a following mechanism, wherein referring an axis orthogonal to the first axis and passing through the displacement detection sensor as a second axis, the following mechanism is provided in the housing, and has a displacement detection sensor holding part for holding the displacement detection sensor, and the displacement detection sensor is movable such that the displacement detection sensor follows the movement in the direction of the second axis of the steering shaft.

21. The steering device according to claim 20, wherein the housing has a following mechanism holding part for holding the following mechanism, the following mechanism includes a following mechanism movable part and a following mechanism fixed part, the following mechanism movable part relatively moves with respect to the following mechanism fixed part in the direction of the second axis so as to be capable of following the movement in the direction of the second axis of the steering shaft, the displacement detection sensor holding part is provided on the following mechanism movable part, and the following mechanism fixed part can be incorporated into the following mechanism holding part in the state in which the following mechanism fixed part and the displacement detection sensor are in an assembled state in the following mechanism movable part.

22. The steering device according to claim 20, wherein the detection target is movable by a predetermined amount with respect to the housing in the direction of the second axis, the following mechanism includes a following mechanism movable part and a following mechanism fixed part, the following mechanism fixed part is fixed to the housing, the following mechanism moveable part is relatively movable with respect to the following mechanism fixed part in the direction of the second axis, and the relative movable distance of the following mechanism movable part with respect to the following mechanism fixed part is longer than the movable distance of the detection target with respect to the housing in the direction of the second axis.

* * * * *